A. M. BENNETT.
ARC WELDING GENERATOR.
APPLICATION FILED MAR. 9, 1918.
1,346,164.
Patented July 13, 1920.
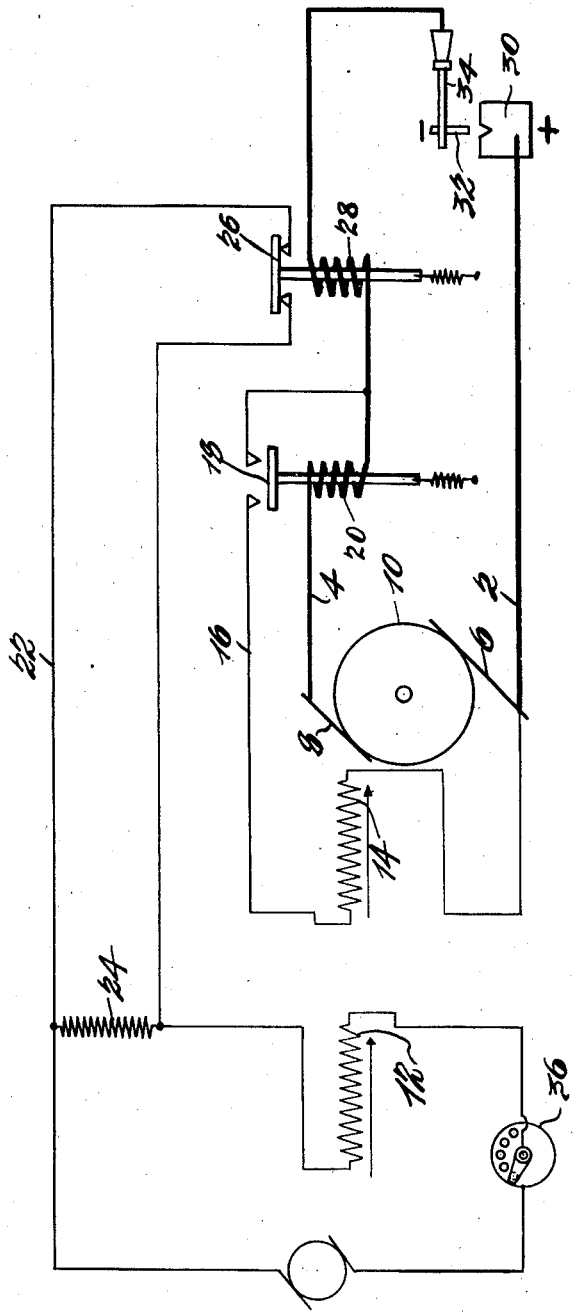
INVENTOR
Alan M. Bennett
BY
Newell & Neal
ATTORNEYS

UNITED STATES PATENT OFFICE.

ALAN M. BENNETT, OF WESTFIELD, NEW JERSEY, ASSIGNOR OF ONE-HALF TO C. H. FLORANDIN, OF WESTFIELD, NEW JERSEY.

ARC-WELDING GENERATOR.

1,346,164.   Specification of Letters Patent.   Patented July 13, 1920.

Application filed March 9, 1918. Serial No. 221,381.

*To all whom it may concern:*

Be it known that I, ALAN M. BENNETT, a citizen of the United States, residing at Westfield, county of Union, and State of New Jersey, have invented certain new and useful Improvements in Arc-Welding Generators, of which the following is a clear, full, and exact description.

This invention relates to generators and particularly to means for generating current for use in electric arc welding, and a general object of the invention is to provide a generator for electric arc welding use, which will produce the desired flow of current, both when striking the arc and during the welding operation, with a minimum of loss of power in the mechanism for controlling the current flow.

By reason of the fact that an increase of the flow of current through an electric arc or an increase in the cross section of the arc reduces the resistance of the arc and thus, with a constant potential, tends to cause the current to be infinite, while on the other hand, a decrease in the current flowing through the arc increases the resistance and tends further to choke off the current until the arc goes out, difficulty has been experienced in providing generators for electric arc welding which will operate satisfactorily both when the arc is struck and during the welding operation.

This difficulty has been overcome in some generators now used by generating an excessive voltage and causing a large proportion of the drop in potential to be taken up in resistance in series with the arc. In other electric arc welding systems, attempts have been made to overcome this difficulty by providing an arrangement of fields intended to give a substantially constant current with a varying potential. In most of these systems, however, where dependence has been placed upon automatic operation, either considerable power is wasted in generating the welding current required or there is an objectionable inrush of current when the arc is struck, the latter characteristic being particularly objectionable in operating on thin plates, because of the liability of burning holes through the plates and also burning out the carbon in the weld.

A particular object of the present invention is a generator for use in electric arc welding which will provide the desired inflow of current when the arc is struck, which will maintain substantially constant the current required for the welding operation, and in which, with a minimum of power loss, the potential will be varied to meet the varying resistance in the arc.

Other objects and important features of the invention will appear from the following description and claims when considered in connection with the accompanying drawing in which the figure shows a diagrammatic view of a generator embodying the present invention.

In the drawing, the main circuit leads 2 and 4 are attached to the brushes 6 and 8 associated with the armature 10, and the generator is provided with two fields, a separately excited field 12 in a circuit fed from any suitable source of energy, and a shunt field 14 in a normally open shunt circuit 16 adapted to be closed by a switch 18 actuated by a solenoid 20 in series with the armature.

The separately excited field 12 is normally in a circuit comprising a short-circuit 22 about a resistance 24, which short-circuit is adapted to be interrupted by means of a switch 26 arranged to be operated by a second solenoid 28 in series with the armature 10.

As hereinabove pointed out, this generator is particularly adapted for use in electric arc welding and in the diagram the article to be welded is shown diagrammatically at 30, and the carbon or metal electrode is shown at 32 in a suitable holder 34.

The operation of the apparatus is as follows: In order to strike the arc, the electrode 32 is brought into contact with the work 30 and is then drawn away from the work, thus producing the welding arc. As the electrode is brought into contact with the work, current will flow through the main circuit 2, 4, generated as a result of the action of the field 12 upon the armature 10, the field 12 being of such strength as to give the desired inflow of current at the time of striking the arc. This inflow is preferably not over twenty-five per cent. above the normal working current, particularly when welding thin plates. As soon as current begins to flow through the main circuit 2, 4, the solenoids 20 and 28, in series with the armature 10, will be energized, the solenoid 20 closing the shunt circuit 16 through the shunt field 14, thus energizing this field to supplement the action of the separately excited field 12, and at the same time the solenoid 28 will open the switch 26, thus breaking the short circuit around the resistance 24, thereby introducing this resistance into the circuit which serves to energize the field 12.

The introduction of the resistance 24 into the circuit through the field 12 serves to reduce the energization of this field at the same time that the action of this field 12 upon the armature 10 is supplemented by the action of the shunt field 14 upon the armature. This prevents the sudden inrush of current which might otherwise take place at the time of striking the arc. The amount of the initial excitation and consequently the amount of inflow of current at the time of striking the arc may be varied by means of a rheostat 36 in the circuit through the separately excited field 12.

The field 14, being in a shunt circuit, will be excited proportionately to the resistance in the arc, and accordingly as the arc resistance increases when the flow of current through the arc tends to decrease, the strength of the field 14 will increase and tend to maintain the flow of the current constant. When the flow of current through the arc tends to increase, the strength of the shunt field 14 will decrease, thus tending to reduce the flow to the desired amount, in accordance with the well-known action of a shunt field.

From the foregoing description it will be seen that the amount of current that flows through the arc circuit at the time the arc is struck can be predetermined by suitable selection or adjustment of the separately excited field 12, and that as soon as this current begins to flow through the arc circuit, thus causing the closing of the circuit through the shunt field, the excitation of the separately excited field will be reduced by the interposition of the resistance 24 in the circuit through this field, thereby compensating for the addition of the inductive action of the shunt field to that of the separately excited field. Moreover, it will further be seen that at the time when the current flow is greatest, that is, at the time when the arc is struck, the inductive action of the shunt field will be least, and that as the arc is extended, thus increasing the resistance at the arc or the fall of potential at the arc, the potential across the shunt field will be greater and the inductive action of the field therefore greater, and accordingly this field will tend to maintain the flow of current through the arc constant.

With a generator of this type, therefore, a satisfactory welding current may be maintained at a very low voltage during the welding operation and with only comparatively slight variations from this voltage at any time. Moreover, the mechanism by which the current is regulated uses up an insignificant amount of the current generated, and thus there is a very slight waste of power. It is estimated that with a generator of this type a welding current of 150 amperes, rising to a maximum of 200 amperes at the time of striking the arc, may be generated with a welding voltage of approximately 18 volts and a maximum of 25 volts.

What I claim as new is:

1. In a generator of the class described, the combination with the armature, and a separately excited field, of a shunt field arranged to coöperate with said separately excited field but normally in an open shunt circuit, and means controlled by the current in the armature circuit when closed for closing the shunt field circuit and simultaneously varying the excitation of the separately excited circuit.

2. In a generator of the class described, the combination with the armature, and a separately excited field, of a shunt field in a normally open shunt circuit, and means controlled by the current in the armature circuit when closed for introducing resistance into the separately excited field circuit and for closing the shunt field circuit.

3. In a generator of the class described having a separately excited field and a shunt field, the combination with means for breaking the shunt field circuit when the armature circuit is open, of means controlled by the armature circuit for closing the shunt field circuit and simultaneously introducing resistance into the separately excited field circuit.

4. In a generator of the class described, the combination with the armature, of a separately excited field, a shunt field arranged to coöperate with said separately excited field but normally in an open shunt circuit, means actuated by the flow of current through the armature circuit for closing the shunt field circuit, and means likewise actuated by said armature circuit current for reducing the excitation of said separately excited field.

5. In a generator of the class described, the combination with the armature, a separately excited field and a shunt field arranged to coöperate with said separately excited field but normally in an open shunt circuit, of means comprising solenoid switches in series with the armature for closing the shunt field circuit and for introducing resistance into the separately excited field circuit when the armature circuit is closed.

6. In a generator of the class described having an armature and a separately excited field, the combination with a shunt field arranged to supplement the inductive action of the separately excited field but normally in an open shunt circuit, of means governed by the closing of the armature circuit for closing said shunt circuit, and means also operated from the armature circuit for varying the inductive action of the separately excited field.

7. In a generator of the class described having an armature and a separately excited field, the combination with a shunt field arranged to supplement the inductive action of the separately excited field and normally in an open shunt circuit, of means governed by the closing of the armature circuit for closing said shunt field circuit, and means also governed by the closing of the armature circuit for varying the inductive action of the separately excited field.

8. In a generator of the class described, adapted to generate a current for arc welding, the combination with an armature, a separately excited field and a field energized by the current generated and having its inductive action governed by the fall of potential across the welding arc, and means governed by the closing of the arc circuit for varying the inductive action of the separately excited field.

Signed at New York city, N. Y., this 5th day of March, 1918.

ALAN M. BENNETT.